United States Patent Office 3,153,813
Patented Oct. 27, 1964

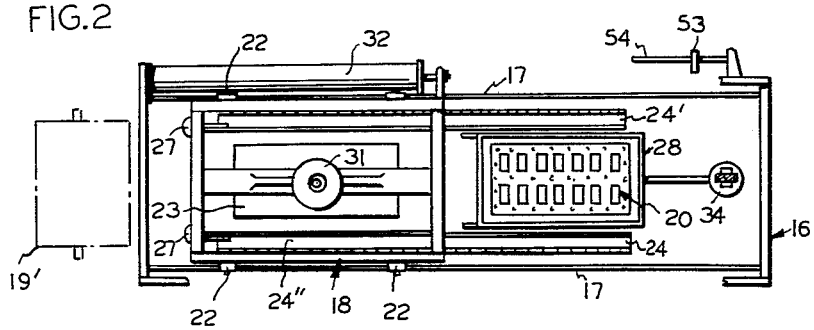
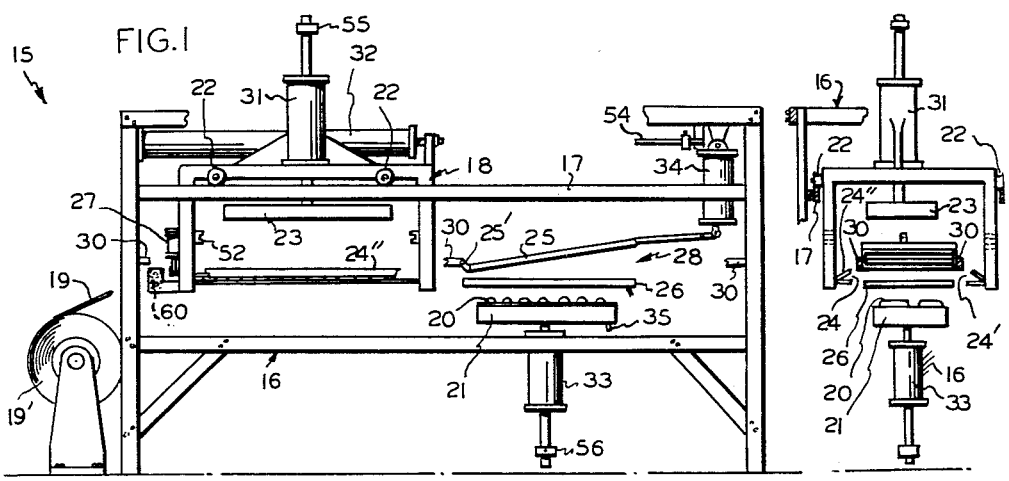
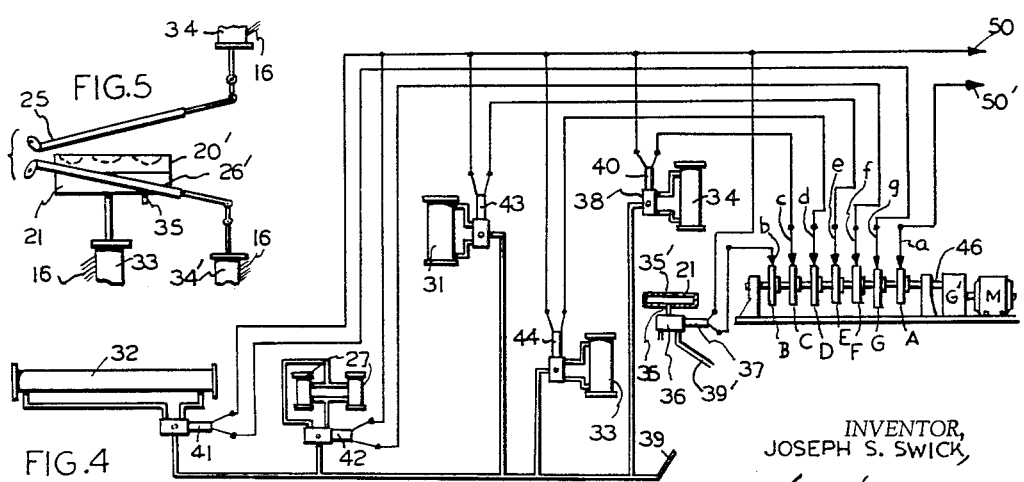

3,153,813
VACUUM MOLDING APPARATUS AND THERMO-
PLASTIC SHEET WORKING GENERALLY
Joseph S. Swick, 116 E. Mosholu Parkway, Bronx,
New York, N.Y.
Filed Apr. 11, 1961, Ser. No. 102,234
3 Claims. (Cl. 18—19)

The present invention relates to vacuum molding machines for working on thermoplastic sheet material to form cup and other relief shapes therein which conform to mold contours where the molds may be either of the male type or the female or cavity type. Of course, the sheet material need be heated to be in a softened condition so that action of the applied vacuum will properly draw it onto a male-type mold or into a cavity mold as the case may be.

Heretofore, the sheet to be worked on was heated only after it came into position over the entire mold. Thus, the continuously actuated heater was idle during the interval it took for the sheet to come to such position, plus the time allotted for the molded work to set and then to be stripped from the mold. In previous machines of this class, there is a heater at rest position aside the molding station. During any run, the heater is at a constant distance above the sheet's plane. The heater moves to be above the sheet at the mold station and is left there a prescribed interval and then shifted back to its rest position aside the work. Besides the mentioned periods of idleness, there is another fault and that is because the sheet is unevenly heated and even damaged thereby, since in the progressive travel of the heater over the edge region it first passes, it effects such region longest and for successively lesser periods over the balance of the sheet, making it evident that the furthest end of the sheet is subjected to heat for the least period by comparison.

It is therefore an object of this invention to provide novel and improved vacuum molding apparatus of the character described, in which heater operation is utilized with maximum efficiency, avoiding its idleness which was an objection in former machines and accomplishing uniform heating of the work which as unobtainable heretofore, thus eliminating any possible damage, burn or other detriment and assuring a homogeneous and a stepped-up rate of production.

A further object is to provide that during the transportation of the sheet to the molding station, it shall be preheated and that maximum heating effect shall occur when the sheet is at the molding station. If desired, the maximum heating effect may be set to commence anywhere in the cycle deemed appropriate depending upon the nature of the sheeting.

A further object thereof is to provide a novel and improved vacuum molding machine construction of the nature set forth, which can be automatic in its operation and in which there is continuous production economically accomplished and giving a uniform product.

Another object is to provide a novel and improved clamping frame for vacuum forming machines of the class mentioned, for receiving and holding the sheet at the molding station and co-operate with the mold to make the vacuum action effective, such frame opening quickly to give proper access for stripping work from out of mold cavities and in all cases offering free passage of the sheet material between the clamping frame sections thereby avoiding the wiping of a softened sheet against a fixed frame during the travel of the sheet to the molding station.

A further object thereof is to provide a novel and improved vacuum molding machine which automatically affords a low degree of heat action for preheating and in the return portions of travel of the heater and in which, adjustment can be made of the scopes of movement of the various components as the work may require.

Another object of this invention is to provide novel and improved apparatus having the attributes mentioned, which is applicable in vacuum molding machines and its incidents of preheating during travel of the sheet to work station and a bit before, and the automatic feed feature accomplished by carriage movement in cooperation with clamping means thereon, are applicable generally to apparatus for doing similar work with thermoplastic sheeting.

Still a further object is to provide novel and improved apparatus of the character described which is simple in construction, reasonable in cost, easy to operate and maintain, whose individual features are applicable in manually-operated, semi-automatic and fully automatic machinery to accomplish the final work and which is easy to operate under all conditions and efficient in carrying out the purposes for which such apparatus is designed.

Other objects and advantages will become apparent as this disclosure proceeds.

For the practice of this invention, its teachings may be included in an automatic machine which is chosen herein to illustrate a preferred embodiment. One form such machine may assume includes a carriage which at the start of the cycle of operation is at a rest position at one side of a molding station and is movable on tracks to be over the molding table and back again to its initial position. This carriage has a flat heater mounted thereon for vertical movement up and down. Below the heater, along track direction, the carriage has a pair of opposite, elongated clamps which are normally open to receive between their jaws, the respective longitudinal edges of web material of thermoplastic quality which comes off a revolvably mounted roll. The carriage at said rest position is intermediate said roll and the molding station. At molding station there is chase or box on a vertically movable table, for holding a mold structure and for the application of vacuum action to the multitude of capillary ducts through the mold bodies whereby softened sheeting applied onto the mold structure would be drawn against or into the mold as the case may be. There is a clamping frame comprised of two frames normally apart to admit the sheeting between them and then made to close to be spanned by the sheeting. This clamping frame opens to allow the removal of the finished work from the mold structure. Air cylinders are respectively associated with the heater, the carriage, the clamps on the carriage, the clamping frame and the mold structure support and a control means is provided to operate said cylinders in the required timed relation, in which control system, the operation of the vacuum action is included. In a special form of clamping frame, provision is made for movement of both its parts. Where necessary, means is also provided for the adjustment of the strokes of the respective air cylinders.

In the accompanying drawing, similar characters of reference indicate corresponding parts in all the views.

FIG. 1 is an elevation of an automatic vacuum forming machine embodying teachings of this invention. Some parts of the framework are shown broken away and others are omitted or are indicated diagrammatically in order to attain clarity of illustration.

FIG. 2 is a top plan view of FIG. 1, and FIG. 3 is an end view of FIG. 1. Here too, parts are omitted or broken away so that pertinent parts can best be seen.

FIG. 4 is a diagrammatic representation of a control system which may be used for the machine here shown. It includes the electrical wiring circuits for the solenoids operating the valves associated with the several cylinders and the vacuum supply at molding station respectively and the piping system to feed compressed air to operate the cylinders. Also included is one form of timing device to accomplish operation of the several components of the system in proper timed relation.

FIG. 5 is a fragmentary view at molding station, showing a modified construction for the clamping frame.

In the drawing, the numeral 15 designates generally a vacuum molding machine, which as shown, consists of stationary framework indicated generally by the numeral 16 including the horizontal tracks or rails 17 to support the carriage 18. Carriage movement is from the position shown where it is intermediate a rotatably supported roll 19' of thermoplastic webbing 19 and the mold structure 20 on a table 21 at molding station, to a position where such carriage on its rollers 22, is over the mold structure and then of course back again and repeated. Said carriage has a horizontal electrically-operated heater 23 thereon, presenting a bottom flat heating surface, below which and along track direction, said carriage has a pair of horizontal, opposite, elongated clamps 24, 24' to receive and grip the respective longitudinal margins of the webbing 19. Each of these clamps may be a long hinge with its lower leaf fixed to the carriage frame and the upper leaf 24" swingable by operation of an air cylinder 27 mounted on the carriage, to open and close such clamps. Over the mold structure 20, there are preferably the rectangular frames 25, 26 normally apart to admit horizontally between them sheet material 19 gripped taut in the clamps 24, 24' and transported between such frames as the carriage 18 assumes its position over the molds. These frames 25, 26 together, constitute a clamping frame 28, which closes to hold the sheet material taut in horizontal position between the mold structure 20 and the heater 23. The lower frame 26 which is below the plane of travel of the sheet material 19, is fixed to the framework 16 below such plane. The upper frame 25 is above such plane and may be swingably mounted at axis 25' onto horizontal bars 30 which may extend from one end to the other end of the machine frame, above the clamps 24, 24', but sufficiently apart to allow up and down movement of the heater 23 as may be accomplished by the operation of the air cylinder 31 mounted on the carriage 18. The air cylinder 32 is for carriage movement, the air cylinder 33 is for up and down movement of the mold-supporting table 21 and the air cylinder 34 is for closing and opening the clamping frame 28. Said cylinders 32, 33 and 34 are mounted on the framework 16.

The mold structure may be of the male type 20 or the cavity or female type 20', having minute perforations and constructed in manner well known in this art for mounting on the table structure or hollow chaise 21 and thus made communicative with vacuum action supplied by suitable vacuum pump apparatus not shown, to port 35 controlled by the valve 36, and thence led through opening 35' to the mold structure. This valve 36 is normally closed, but is arranged to open upon actuation of the electrical solenoid 37.

In the control system shown in FIG. 4, which is one way that may be used, each of the air cylinders 27, 31–34 is double acting and is controlled by a valve of similar type as shown at 38 which normally connects one end of the cylinder it is associated with, to atmosphere, and the other to compressed air supplied to the distributor pipe 39. Upon actuation of the valve's related solenoid 40, the cylinder end which was connected to atmosphere will now receive compressed air and the cylinder end which initially was supplied compressed air, will now be connected to atmosphere. The solenoid 41 is for operating the valve associated with the cylinder 32. The solenoid 42 is for operating the valve associated with the cylinders 27. The solenoid 43 is for operating the valve associated with the cylinder 31. The solenoid 44 is for operating the valve associated with the cylinder 33.

In this system illustrated to show one manner of control, there is a timing apparatus indicated generally by the numeral 45 which serves to operate all the components in proper timed relation, and such consists of a revolvably mounted shaft 46 driven by a motor M through a gear box G' so that the shaft shall revolve at such speed that during one revolution of said shaft 46, machine operation is one complete cycle. Hence, one terminal of each of the solenoids, is connected to the terminal 50 of a suitable electrical power supply. The other power supply terminal 50' is connected to a stationary brush $a$ which is in constant contact with the circular wheel A secured on said shaft. The other terminals of said solenoids 37, 40, 44, 43, 42 and 41 are respectively connected to the fixed brushes $b, c, d, e, f$ and $g$. Each brush is adapted to coact with a cam designated by its similar capital letter. All the cams B–G and the wheel A are electrically conductive and so is the shaft 46 which carries all of them and makes them all electrically connected. The cams are each designed so that through a predetermined part of a revolution in respect to each of them as need be, they are in contact with their related brushes and for the balance of the revolution of the shaft 46, they are out of contact with their related brushes, and the cams are so arranged on the shaft around the 360 degrees of the shaft, that the several valves shall be operated in proper timed relation in accordance with the sequence of occurrences as set forth in the cycle of operation. It is evident that during such interval that a cam remains in contact with its related brush, that the circuit of its associated solenoid remains closed. When there is no such contact, that particular circuit is open.

At the commencement of a cycle of operation, the condition of the machine 15 is as shown in FIG. 1, with the addition that the thermoplastic web 19 passes from off the supply roll 19', to be guided between the rollers at 60, and extends along and within the clamps 24, 24' and spanned between such clamps below the heater 23. It is to be noted that in the condition shown, the carriage 18 is away to one side of the molding station, the heater 23 is in its raised position, said clamps 24, 24' are in open condition, the clamping frame 28 is also in open condition and the mold support 21 is in its lowered position. All solenoid circuits are open. The heater 23 is always "on" and motor M is actuated. During every revolution of the shaft 46, the following events will occur and their sequence will be as follows per revolution of said shaft.

The cam F coming in contact with the brush $f$, act as a switch to close the circuit of solenoid 42 which in turn will operate the cylinders 27 and the clamps 24, 24' will close tight, thereby gripping the longitudinal edges of the sheet material 19. The raised heater 23, during this time, warmed the sheet length which is between said clamps 24, 24'. Next, the cam G coming in contact with the brush $g$, actuates the solenoid 41 which in turn will operate the cylinder 32 and the carriage 18 will move so that the heater 23 and the sheet portion clamped by 24, 24' below it, are both directly above the mold structure 20. During this movement of the carriage, the raised heater continued to warm, that is, preheat the sheet material below it, and due to such carriage movement, the preheated sheet length was transported to lie between the frames 25, 26 of the clamping frame 28. Of course, a length of web 19 unwound off the roll 19', is now where the carriage was originally. Next, brush $c$ contacts cam C, closing the circuit of solenoid 40, which in turn operates the associated valve and the cylinder 34 will be operated to cause the clamping frame 28 to close. Simultaneously, the cam F ceases its contact with the brush $f$, thus deactuating the solenoid 42 and hence the cylinders 27 will thereupon be operated whereby the clamps 24, 24' open. Also simultaneously with the closing of the clamping frame 28 and the release of hold of the clamps 24, 24', or even a bit sooner if desired, the cam E coming in contact with the brush $e$ will actuate the solenoid 43 which in turn will cause the operation of the cylinder 31 to lower the heater 23. After a prescribed interval during which the preheated sheet length is now subjected to a high heat required to soften the sheet to a condition proper for molding, the cam B coming in contact with the brush b, actuates the solenoid 37 which causes the application of vacuum at 35 and at the same time, the cam D coming into contact with the brush d, actuates the solenoid 44 which causes the cylinder 33 to be operated whereby the supporting table 21 and the mold structure 20 thereon are lifted. The molds meet the underside of the heated sheet material and the support comes up a bit through the clamping structure 28 whereby a seal is formed permitting the sucking action of the applied vacuum to draw the sheet against the mold surfaces as is well known in this art. At a prescribed time during the molding operation, the cam E ceases its contact with the brush e, thereby deactuating the solenoid 43 whereby the cylinder 31 will be operated to lift the heater 23 and also the cam G ceases its contact with the brush g thereby deactuating the solenoid 41 whereby the cylinder 32 will be operated to return the carriage 18 along tracks 17 to its initial position as shown in FIG. 1. It is to be noted that since the return movement of the carriage is very rapid and the heater 23 is in its raised position, there has been a slight heating effect on the new stretch of webbing now lying under the heater and spanning the clamps 24, 24' which hold the longitudinal edges of the new length of webbing to be next worked on, but there has been no chance of burning the sheeting and the heating effect during such return movement of the carriage 18 is negligible. However, while the molding operation continues and while the molded work sets and for the time it takes to strip the finished work from the mold structure 29, the effect of the raised heater is to preheat the sheet material next to be worked on, thus saving heating time at molding station.

After a definite interval, the cam C ceases its contact with the brush c, thus deactuating the solenoid 40 whereupon the cylinder 34 is operated to open the clamping frame 28 and the cam D ceases its contact with the brush d, thus deactuating the solenoid 44 whereupon the cylinder 33 is operated to lower the mold supporting table 21. Further, the cam B ceases its contact with the brush b, this deactuates the solenoid 27 and causes a shut off of the vacuum action at 35. This completes one cycle of operation, the condition of the machine 15 is again as shown in FIG. 1 and the shaft 46 has made one complete revolution. Of course, compressed air is continuously supplied into 39 and operating vacuum pumps are continuously connected at 39'. It is evident that this machine can continue automatically, because the carriage movement not only transports the heater, but also automatically feeds new lengths of sheeting. Since that portion of the sheeting last worked on and molded, continues integral with the web supply, some suitable cut-off device not shown, may be associated with the machine 15 at the right end in FIG. 1. While the machine is being set up, a new roll 19' mounted in place on the machine has the heater 23 actuated but the machine is to be idle when of course the motor M is not working, then a heat-insulative panel not shown, may be inserted in the corner channel brackets 52 to act as a removable baffle between the heater 23 and the sheet material spanning the opposite clamps 24, 24'.

It is preferred to provide adjustment of the scope of movement of especially the pistons of the cylinder 32 which moves the carriage 18, that of the cylinder 31 which moves the heater 23 and that of the cylinder 33 which moves the mold-support 21. To limit carriage movement, there is the adjustable collar stop 53 along the rod 54 which is fixed to the framework 16. For the cylinders 31 and 33, their piston rods extend through both ends of these respective cylinders and are provided with adjustable stop collars as 55 and 56.

Of importance to note is that the sheet portion to be worked on is subjected to preheating and that at all times all heating is uniform throughout the entire sheet portion because the sheet travels with the heater 23 and that the carriage serves not only to transport the heater but is the automatic feed means accomplished with the cooperation of the operated clamping means 24, 24' carried on the carriage 18, and there is automatic registering of the sheet portion worked on with the heating means and in relation to the molding structure 29.

In order to avoid that a softened heated sheet portion shall wipe against the lower clamping frame member 26 during carriage movement to molding station, said member may also be movably mounted as shown in FIG. 5 at 26' and movement of such member 26' may be effected by its own cylinder 34' acting in concert with the cylinder 34 which moves the upper frame member 25. The wider divergence of said clamping frame members when said clamping frame is opened, gives greater accessibility to the mold structure to facilitate stripping of finished work therefrom and whereas the clamping frame 28 is shown operating for what is known as downward "drape," the clamping frame shown in FIG. 5 is adapted to installations in this art where there is to be an upward "drape."

Although the preferred embodiment of this invention is shown in the form of a fully automatic machine 15, by use of cylinders and control means to operate them in a proper timed relation, other actuable and controllable means may be used in place of the specific expedients specifically here used and illustrated, and if desired the incidents of this invention without the automatic operation features, may be used where manual manipulation is employed to close the clamping means and move the carriage and to move the heater in a succession performed by an operator in proper succession and timed relation.

The transportation of the sheet to be worked on to work station where in such travel the sheet is preheated and the automatic feed of the sheeting accomplished by carriage movement in cooperation with the clamping means thereon, are features which are applicable to many types of apparatus for working on thermoplastic sheet material and it is intended that such features per se are covered by claims herein included.

This invention as to each of its features of construction and functional relationship of parts may assume numerous forms and various applications without departing from the essential features herein disclosed. It is therefore intended and desired that the embodiments shown herein shall be deemed merely illustrative and not restrictive and that the patent shall cover all patentable novelty herein set forth; reference being had to the following claims rather than to the specific showing and description herein to indicate the scope of this invention.

The claims are as follows:

1. The combination in an apparatus for doing work on thermoplastic sheet material, a carriage mounted on frame-work for forth and back movement from a first position aside a station where the work is to be performed, to said work station which holds means to perform the work, a heater mounted on the carriage at a position so that said heater is directly above said work station when the carriage is at work station position and entirely to one side of said work station when said carriage is at said first position away from said work station; said heater being movably mounted on said carriage for movement along the vertical and said heater being in a predetermined raised position when entirely aside the work station before the carriage is moved towards the work station position, heater-moving means controlled by timing means for automatically moving said heater to a predetermined lowered position at a predetermined time in relation to the arrival of the carriage entirely over the work station and to automatically move said heater to said raised position at a predetermined time after the carriage has arrived at work station position, sheet-holding means on the carriage for receiving and releasably spanning a thermoplastic sheet to be worked on, opposite and directly below said heater in a predetermined plane intermediate said heater and the means on the work station and means to lead thermoplastic sheet material to said first position to be held by said sheet-holding means upon return of the carriage from said work station to said first position while work is being done at the work station on thermoplastic sheet material last transferred by movement of the carriage from said first position to said work station.

2. In a vacuum molding apparatus, a vacuum table having a vacuum opening and adapted to support a vacuum mold structure thereon communicative with said opening, a carriage mounted on framework, for back and forth movement from a position aside the mold support to a molding station position over said support, a heater carried on the carriage at a position that said heater is directly above said mold support when the carriage is at molding station position and entirely to one side of said support when the carriage is away from molding station position, sheet holding and clamping means on the carriage for spanning a thermoplastic sheet to be molded, opposite and directly below the heater in a predetermined plane intermediate the heater and said support, said heater being movably mounted on the carriage for movement along the vertical, said clamping means being positioned to grip opposite edges of a sheet along the direction of travel of the carriage, guide means on the carriage to guide sheet material which is part of a roll into said clamping means in the direction the carriage moves towards molding station position, a clamping frame comprising a pair of normally spaced frames one above the other; the space between said frames being enterable by a sheet spanned on the carriage during movement of the carriage to molding station position; said frames being relatively movable towards each other to clamp a sheet portion which is brought by the carriage between them; said clamping frame being between the paths of the clamping means on the carriage; a first means for moving the carriage to and away from molding station position, a second means for moving the heater up and down, a third means for operating the clamping means on the carriage to open and close, a fourth means to open and close the clamping frame, means applying vacuum action to the table, valve means to control the application of the vacuum action and a means for operating said first, second, third and fourth means and said valve means in a predetermined timed relation.

3. An apparatus as define in claim 2, wherein the table is mounted for movement along the vertical and is enterable through the frames of the clamping frame and a fifth means for raising and lowering said table; the means for operating the mentioned means and the valve in a predetermined time relation, also controlling the operation of said fifth means in a predetermined timed relation.

References Cited in the file of this patent

UNITED STATES PATENTS

| | | |
|---|---|---|
| 2,179,692 | Fuchs | Nov. 14, 1939 |
| 2,377,946 | Leary | June 12, 1945 |
| 2,522,956 | Middleton | Sept. 19, 1950 |
| 2,836,852 | Butzko | June 3, 1958 |
| 2,907,069 | Butzko | Oct. 6, 1959 |
| 2,962,758 | Politis | Dec. 6, 1960 |
| 2,989,780 | Zimmerman | June 27, 1961 |
| 3,025,566 | Kostur | Mar. 20, 1962 |

FOREIGN PATENTS

| | | |
|---|---|---|
| 1,158,122 | France | Jan. 13, 1958 |
| 827,845 | Great Britain | Feb. 10, 1960 |

OTHER REFERENCES

Modern Plastics, pages 90–91, May 1954.